US009015151B1

(12) United States Patent
Margulis et al.

(10) Patent No.: US 9,015,151 B1
(45) Date of Patent: Apr. 21, 2015

(54) CONTENT TARGETING TO PARTICULAR INDIVIDUALS BASED ON DEMOGRAPHIC AND PSYCHOGRAPHIC SEGMENTATIONS, UTILIZING THE COMPUTER-IMPLEMENTED METHODS AND SPECIFICALLY PROGRAMMED COMPUTER SYSTEMS FOR PERFORMING THEREOF

(71) Applicant: QuikBreak, Tel Aviv (IL)

(72) Inventors: Oran Perry Margulis, Tel Aviv (IL); Gil Aaron Margulis, Tel Aviv (IL)

(*) Notice: Subject to any disclaimer, the term of this patent is extended or adjusted under 35 U.S.C. 154(b) by 0 days.

(21) Appl. No.: 14/291,739

(22) Filed: May 30, 2014

Related U.S. Application Data

(63) Continuation of application No. 14/047,232, filed on Oct. 7, 2013.

(60) Provisional application No. 61/711,867, filed on Oct. 10, 2012.

(51) Int. Cl.
*G06F 17/30* (2006.01)
*G06Q 30/02* (2012.01)
*G06Q 50/00* (2012.01)

(52) U.S. Cl.
CPC ...... *G06Q 30/0269* (2013.01); *G06F 17/30861* (2013.01); *G06Q 50/01* (2013.01)

(58) Field of Classification Search
CPC ....... G06Q 30/02; G06Q 50/01; G06Q 30/06; G06Q 30/0267; G06Q 30/0269; G06Q 30/0273; G06Q 30/0255; G06Q 30/0241; G06Q 30/0261; G06Q 30/0271; G06Q 30/0276; G06Q 30/0277; G06Q 30/0631; G06F 17/30; G06F 17/30867; G06F 17/30035; G06F 17/30699; H04N 21/25; H04N 21/45; H04N 21/46; H04N 21/25883; H04N 21/25891; H04N 21/454; H04N 21/466; H04N 21/4668; H04W 4/20; H04W 4/206
USPC .......... 705/14.66, 14.53, 14.64, 14.69, 14.72, 705/14.73, 26.7; 707/999.003, E17.109, 707/748, 783, 999.005, 722; 715/747; 725/42, 46
See application file for complete search history.

(56) References Cited

U.S. PATENT DOCUMENTS

| | | | | |
|---|---|---|---|---|
| 8,364,540 | B2* | 1/2013 | Soroca et al. | 705/14.64 |
| 2006/0282328 | A1* | 12/2006 | Gerace et al. | 705/14 |
| 2008/0215429 | A1* | 9/2008 | Ramer et al. | 705/14 |
| 2008/0294607 | A1* | 11/2008 | Partovi et al. | 707/3 |
| 2009/0132365 | A1* | 5/2009 | Gruenhagen et al. | 705/14 |
| 2010/0031162 | A1* | 2/2010 | Wiser et al. | 715/747 |
| 2010/0094878 | A1* | 4/2010 | Soroca et al. | 707/748 |

(Continued)

*Primary Examiner* — Dennis Truong
(74) *Attorney, Agent, or Firm* — Barry Schindler; Lennie Bersh

(57) ABSTRACT

In some embodiments, the present invention is directed to a computer-implemented method which includes at least the following steps of requesting a consent to obtain an individual social media profile data; based on the consent, electronically obtaining the individual social media profile data from a social media electronic data source; determining individual specific parameters based on the individual social media profile data; matching the individual specific parameters to at least one segment identifier generated based on a predetermined segmentation of a target population of individuals; based on the matching, associating the at least one segment identifier with the individual social media profile data; and outputting an advertisement to the individual based on the at least one segment identifier associated with the individual social media profile data of such individual.

8 Claims, 6 Drawing Sheets

(56) References Cited

U.S. PATENT DOCUMENTS

| | | |
|---|---|---|
| 2010/0332305 A1* | 12/2010 | Higgins et al. ............ 705/14.16 |
| 2011/0047031 A1* | 2/2011 | Weerasinghe ............ 705/14.66 |
| 2012/0066064 A1* | 3/2012 | Yoder et al. ................ 705/14.53 |
| 2012/0095863 A1* | 4/2012 | Schiff et al. ................. 705/26.7 |
| 2012/0123875 A1* | 5/2012 | Svendsen et al. .......... 705/14.72 |
| 2012/0215640 A1* | 8/2012 | Ramer et al. ............... 705/14.55 |
| 2013/0024371 A1* | 1/2013 | Hariramani et al. ............ 705/41 |
| 2013/0124447 A1* | 5/2013 | Badros et al. .................... 706/52 |
| 2013/0159081 A1* | 6/2013 | Shastry et al. ............. 705/14.23 |
| 2013/0166332 A1* | 6/2013 | Hammad .......................... 705/5 |
| 2013/0218687 A1* | 8/2013 | Sohangir et al. ........... 705/14.66 |
| 2013/0275223 A1* | 10/2013 | Brelig et al. ............... 705/14.61 |
| 2013/0305287 A1* | 11/2013 | Wong et al. ...................... 725/42 |
| 2013/0346170 A1* | 12/2013 | Epstein et al. ............. 705/14.14 |
| 2014/0100965 A1* | 4/2014 | Lessin ........................ 705/14.66 |

* cited by examiner

CONTENT TARGETING TO PARTICULAR INDIVIDUALS BASED ON DEMOGRAPHIC AND PSYCHOGRAPHIC SEGMENTATIONS, UTILIZING THE COMPUTER-IMPLEMENTED METHODS AND SPECIFICALLY PROGRAMMED COMPUTER SYSTEMS FOR PERFORMING THEREOF

CROSS-REFERENCE TO RELATED APPLICATION

The present application is a continuation of U.S. patent application Ser. No. 14/047,232, filed Oct. 7, 2013, which claims priority benefit to U.S. Provisional Patent Application No. 61/711,867 filed Oct. 10, 2012, which are hereby incorporated herein by reference.

FIELD OF THE INVENTION

The present invention relates generally to methods and systems for matching users with appropriate advertising and entertainment media, and more specifically to methods and systems for matching target audiences with appropriate advertising and entertainment media based upon a user social media profile.

BACKGROUND ART

Target audience matching techniques are generally known. For example, U.S. Patent Application Publication No. 2012041792 is generally directed to a method of segmenting a population. U.S. Pat. No. 8,131,271 is directed to categorization of a mobile user profile based upon browsing behavior. Similarly, U.S. Patent Application Publication No. 2010203876 describes a method of inferring user profile properties based upon mobile device usage.

SUMMARY OF THE INVENTION

With parenthetical reference to the corresponding parts, portions or surfaces of the disclosed embodiment, merely for purposes of illustration and not by way of limitation, the embodiments provide a system (110) for matching entertainment media and/or branded media shorts to a target audience (101) using a matching algorithm (163) based upon social media user profile databases (142) and census based demographic population segmenting databases (136). The system includes a software application (128) installed on a user portable device (126) and a matching server (134) residing at a remote location. The server (134) and the software application (128) interact with an advertising server (136), a social media server (142), and media content server (171). The software application may be installed on a user's portable device by downloading from a third party application distribution platform/store (176). The matching server (134) may include a segment list (135) of segment numbers provided from the census based demographic population segmenting databases. The matching server (134) may include a media short database (137) of links to media shorts tagged with appropriate segmentation numbers from the segment list. The matching server further may contain a user database (141) for storing a user's username and a list of appropriate segmentation numbers. A segment number assignment algorithm (161) may also be configured and arranged to run on the matching server and be used for creating the user database. The matching server may also have a media short matching algorithm (163) which generates a result list (143) of media short matches to a user's profile and desired media short type. Additionally, the media content server may contain a database of video short files (172).

In another aspect, provided is a method (210) for matching entertainment media and/or branded media shorts to a target audience having the major phases of a preinitialization phase (300), an initialization phase (400), a usage phase (500), and a post play phase (600). The preinitialization phase may involve the steps of creating a segmentation list (303), creating a media short database (307), and tagging media short entries in the media short database with appropriate segmentation numbers (309). The initialization phase may involve the steps of having a user download the software application (402), installing the software application on a user's portable media device (403), and asking a user for permission to obtain a user's third party social media profile information (405). The initialization phase may also include the steps of obtaining the social media profile information (409), forwarding the user profile data from the software application to the matching server where a user database record is created (421), and tagging the user database record with appropriate segmentation numbers (423).

The usage phase may include the steps of having the software application ask the user for a desired media short duration (502) and ask for a desired media short genre (503). The usage phase may also include the steps of sending a request from the software application to the matching server for matching media shorts (504) and generating a result list using a matching algorithm (509). Also included in the method may be the step of having the server transmit a subset of the result list to the software application (511), and displaying the subset of the result list thumbnails and asking the user for a selection (512). Additionally, the usage phase may include the step of the user requesting another set of recommendations (514), or the step of the user selecting a media short (515). The usage phase may further include the steps of launching a media player (517), contacting the matching server for advertising clip information (521), and contacting the advertising server for a branded media datastream (523). The usage phase may include the step of launching the data stream (525).

The post play phase may include the step of the software application displaying a graphical user interface asking the user whether to play the next clip in a series, or whether a new set of recommendations is requested (602). The post play phase may further include the step of having the user select the next clip in the series and launching the media stream (604).

DESCRIPTION OF THE PREFERRED EMBODIMENTS

Figure 1:
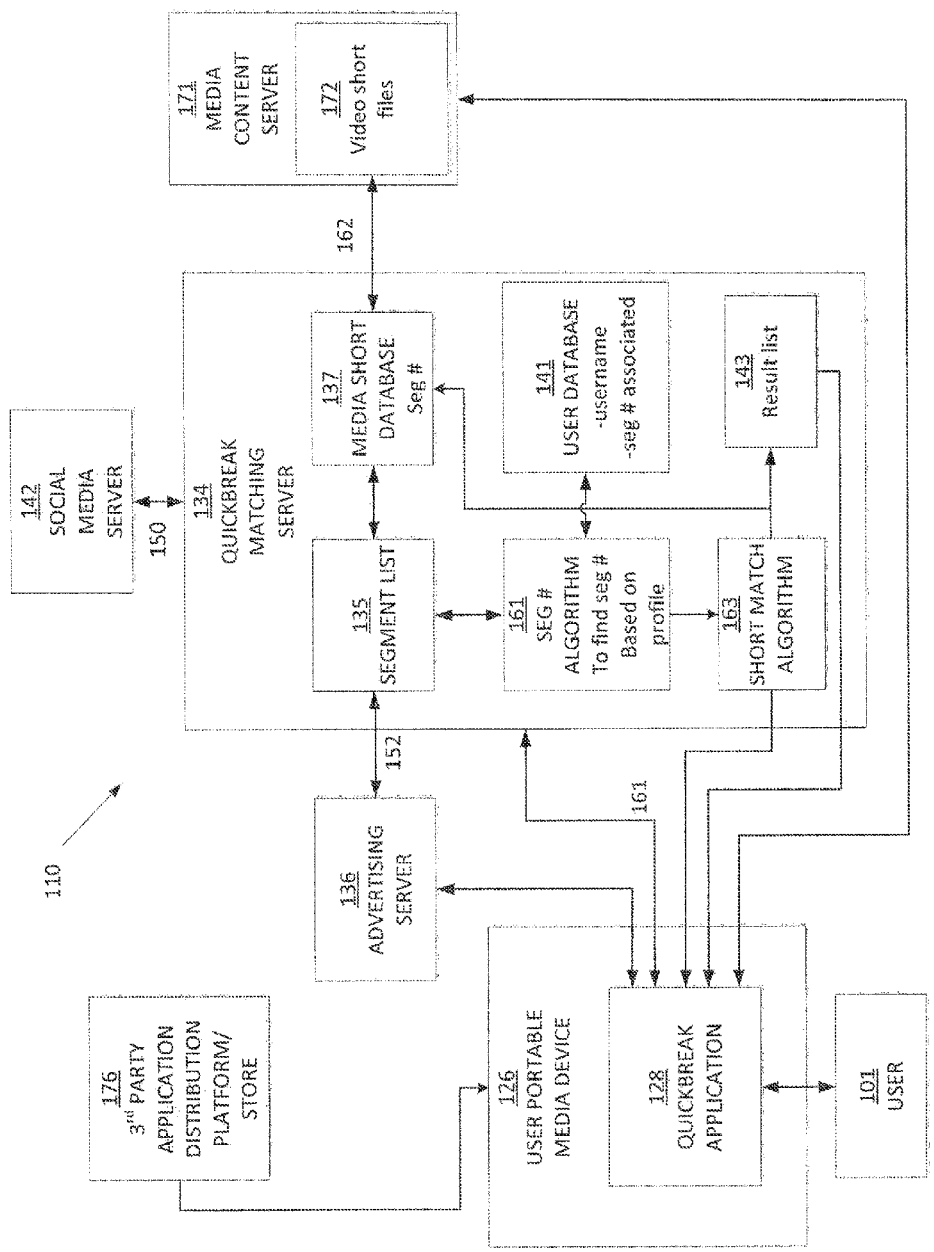
FIG. 1 is a block diagram of a first form of the system for matching a target audience with appropriate media shorts and advertising.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, and more particularly to FIG. 1 thereof, a first embodiment of the matching system is shown generally at 110. Matching system 110 comprises the main components of software application 128 installed on user portable device 126, and matching server 134 residing at a remote location. From a high level perspective, server 134 and software application 128 interact with advertising server 136, social media server 142, and media content server 171.

Portable device 126 connects to third party application distribution platform/store 176 in order to install software application 128. Software application 128 has a user interface for interacting with user 101. Software application makes a network connection to server 134 through link 161. Link 161 is a cellular mobile data connection such as 3G, 4G, LTE, CDMA, GSM, EDGE, EVDO or other similar technology.

Server 134 contains several data structures and algorithms. As shown in FIG. 1, server 134 contains segment list 135, media short database 137, user database 141, segment number algorithm 161, short match algorithm 163, and result list 143. Segment list 135 provides a predetermined segmentation of a target population. For example, one form of segment list 135 is a set of segment numbers, in which each segment number is associated with a set of United States geographic zip codes. In this example, each segment number represents a set of the United States population. Alternative implementations of segment list 135 involve the association of set numbers with other population data, such as age group, sex, political group, or the like. More specifically, in this embodiment, segment list 135 utilizes the segment numbers from the ConneXions/PRIZM segmentation system provided by The Nielsen Company, New York, N.Y., USA. Segment list 135 may be implemented as a database, such as Microsoft SQL, MySQL, PostgreSQL, or the like, or may be implemented as a alternative data structure, such as a hash table, dictionary, heap, or other similar data structure. Segmentation list 135 is used by segmentation number lookup algorithm 161.

Segmentation number look up algorithm 161 provides a set of segmentation numbers that are matched to a user profile. A user profile contains data specific to a user which is typically maintained by social media services, and typically includes a user's geographic zip code, age, gender, and other similar data. One implementation of the segmentation look up algorithm takes a user's zip code alone, and looks up all segmentation numbers in segmentation list 135 associated with the given zip code. Such look up functionality can be specifically accomplished through an SQL query if segmentation list 135 is a database, or through a hash table look up, if segmentation list 135 is a hash table or dictionary. Other implementations of segmentation number look up algorithm 161 include using more user profile parameters, such as age group, and gender, and involve a matching algorithm such as vector based similarity ranking through cosine similarity, or the like.

Server 134's media short database 137 is a database for containing media short data. The data may be links to third party media shorts, such as short videos, in which each media short link is associated with a set of segmentation numbers from segmentation list 135. Alternatively, media short database 137 may contain actual media content such as video clip data files. One type of entry in media short database 137 includes html address links to youtube.com video clips, where each clip is tagged with an appropriate segmentation number determined by a manual review of the clip. For example, a short youtube.com video about parenting may be tagged with the segmentation numbers associated with individuals having children. Each media short link in database 137 may also be tagged with other identifying information such as the media short genre, duration, and/or other similar information.

Server 134's user database 141 stores a user's unique identifier and a set of segmentation numbers identified by segmentation number match algorithm 161 based upon a given user's profile. A user's unique identifier may be a user's social media username, id number, or the like.

Server 134's short match algorithm 163, is responsible for finding a set of appropriate database entries in media short database 137, based upon a user's segmentation numbers in user database 141, and any other search parameters provided by a user, such as desired genre or video short duration. Result list 143 is a temporary data structure for storing the results from a run of short match algorithm 163.

Server 134 and application 128 contain network socket interfaces for the transfer of data between each other. These network interfaces may be encrypted, for example, using SSL encryption.

Server 134 also contains network interfaces for interfacing with social media server 142, media content server 171, and advertising server 136. Social media server 142, is a server for a social media site such as facebook.com, and whose purpose is to provide server 134 with user profile information. Media content server 171 is a third party media content provided, such as youtube.com, which is capable of streaming video shorts to software application 128. Such streaming video shorts may be relayed through server 134, or be provided directly to software application 128. Similarly, advertising server 136, provides short streaming advertisements to software application 128. Such advertisements may be relayed through server 134 or provided directly to application 128.

Software application 128 may be implemented as a downloadable application such as: an apple IOS application available from Apple's Appstore, an android application available from Google Play, or other similar application technology/platform.

Figure 2:
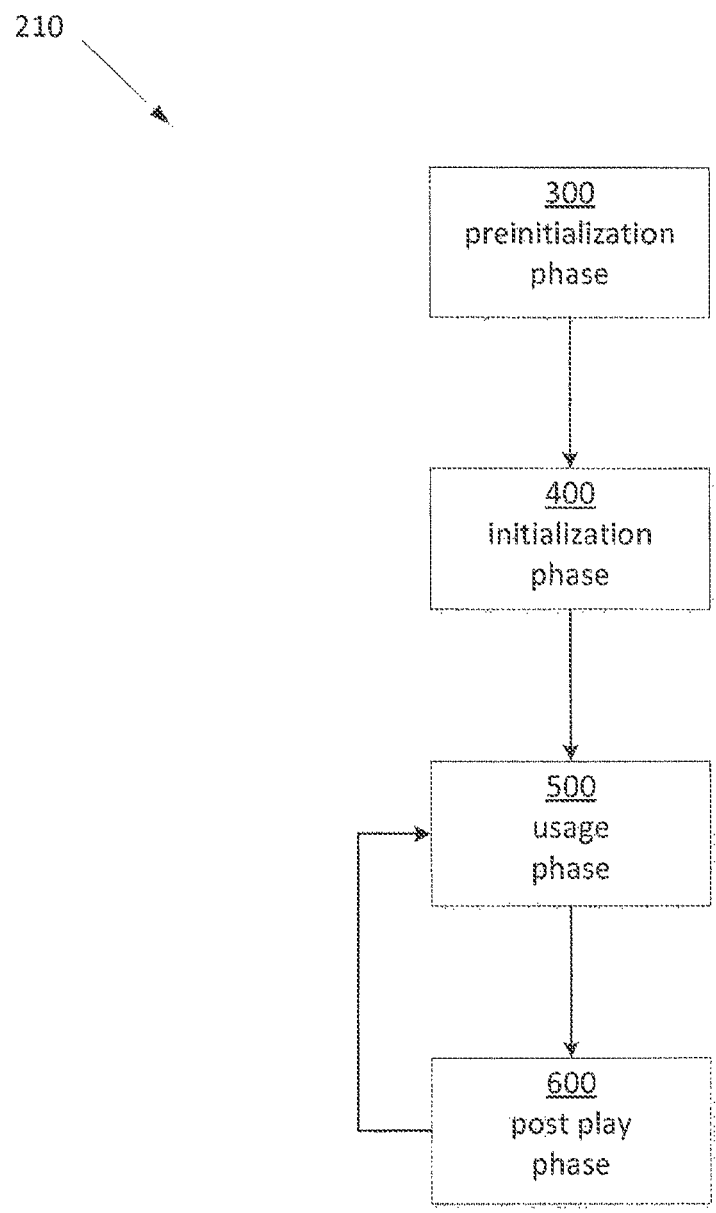
FIG. 2 is a flow chart of the method of matching a target audience with appropriate media shorts and advertising.

Shown in FIG. 2, is a method of operation 201 for system 110. Method 210 has the main phases of: preinitialization phase 300, initialization phase 400, usage phase 500, and post play phase 600. Preinitialization phase 300 includes the steps involved in the preparation and setting up the necessary data structures on server 134. Initialization phase 400 contains the steps that allow a user to download, install, and initialize software application 128 on a user's portable device 126. Usage phase 500 involves the steps performed in a typical user sitting including matching and playing of a matched media short. Post play phase 600 involves the steps involving providing a user ability to initiate additional usage options.

Figure 3:
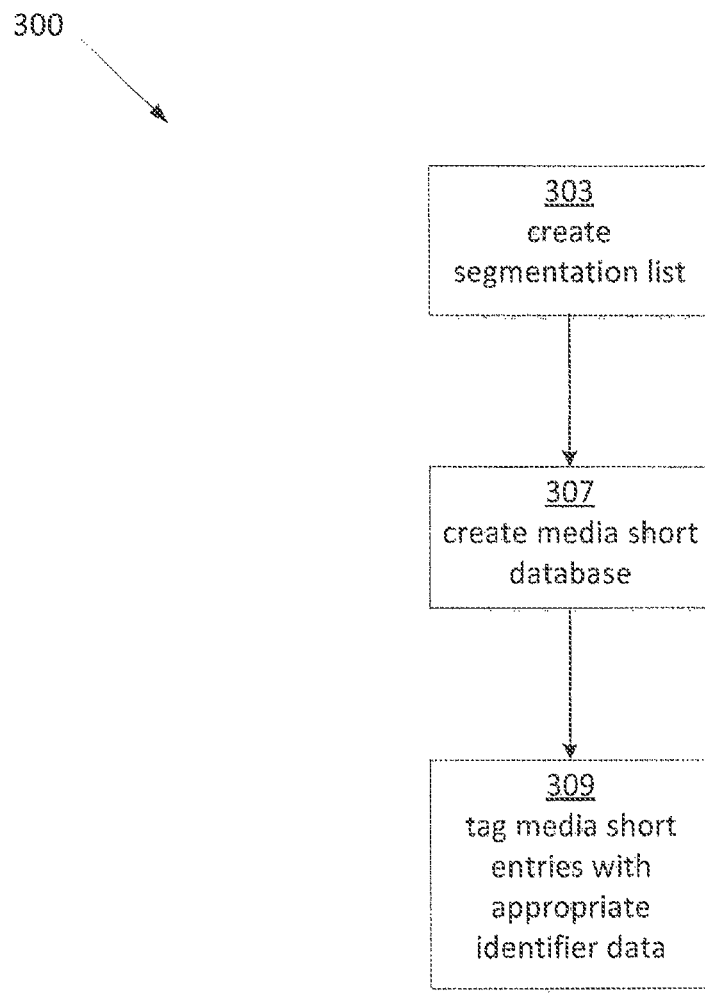
FIG. 3 is a flow chart of the preinitialization phase shown in FIG. 2.

As shown in FIG. 3, preinitialization phase 300 begins with step 303, the creation of segmentation list 135 on server 134. Segmentation list 135 is populated with a set of segmentation numbers tagged with demographic information from a source such as the Connexions/Prizm segmentation methodology provided by The Nielsen Company, New York, USA. Next, step 307 is the creation of media short database 137 by either manual or automatic filling in of external media short links. The media short links may point to media content stored either on a third party content provider, such as media content server 171, advertising server 136, or may point to media content files stored on matching server 134. A relationship may or may not be established with the providers of media content server 171. Step 309 follows, which is the tagging of each external media short link inserted into database 137 with appropriate identifier data. Tagged data includes segmentation number, media short duration, and genre. Additional data which may be added to each database 137 include the video short's title, description, and a representative thumbnail. After preinitialization phase 300 is complete, initialization phase 400 may begin.

Figure 4:
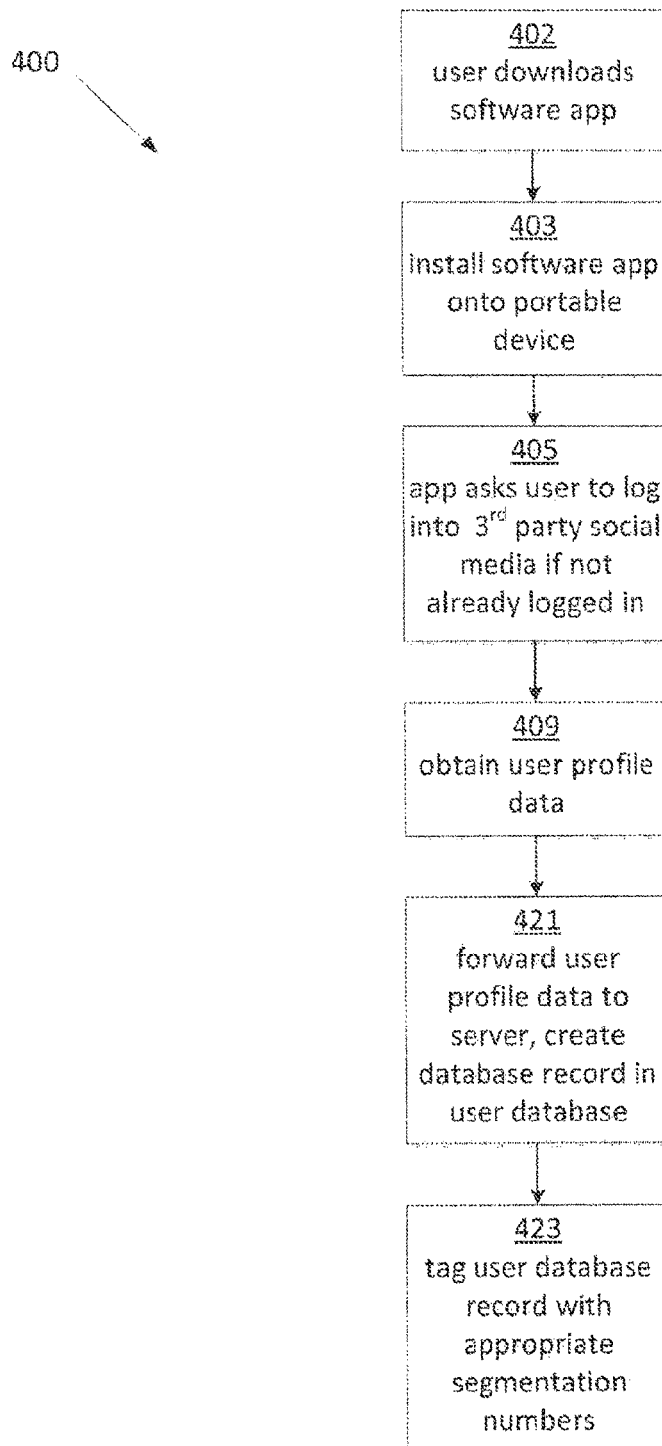
FIG. 4 is a flow chart of the initialization phase shown in FIG. 2.

FIG. 4 shows the steps in initialization phase 400. Initialization phase 400 begins with step 402, when a user, such as user 101, downloads software application 128 from an application provider. Various application providers are the Apple app store, Google Play, App Brain, or other similar application providers. Next, step 403 is the installation of software application 128 by user 101 onto his/her portable media device 126. In step 405, application 128 checks to see of media device 126 is already logged into the target third party social media service or server 142, such as Facebook, and if not, requests user 101 to login. This step may be implemented through an application programming interface provided by the third party social media service, such as the Facebook API. After logging into the social media service/server 142, step 407 involves asking user 101 for permission to access the profile data of user 101 from the social media server 142, which user 101 provides in order to proceed. In step 409, the user profile data is obtained. Step 409 may comprise software application 128 interacting with a social media application installed on media device 126 through a provided API, and/or may involve server 134 interacting with social media server 142.

In step 421, the user profile data is received by server 134, and a new database entry in user database 141 is created based on unique data of the profile of user 101, such as a Facebook login ID, or other similar unique data. In step 423, a set of segmentation numbers is tagged to the user database entry in user database 141 by algorithm 161 based upon the user's profile data. After initialization phase 400 is complete, usage phase 500 may be started.

Figure 5:
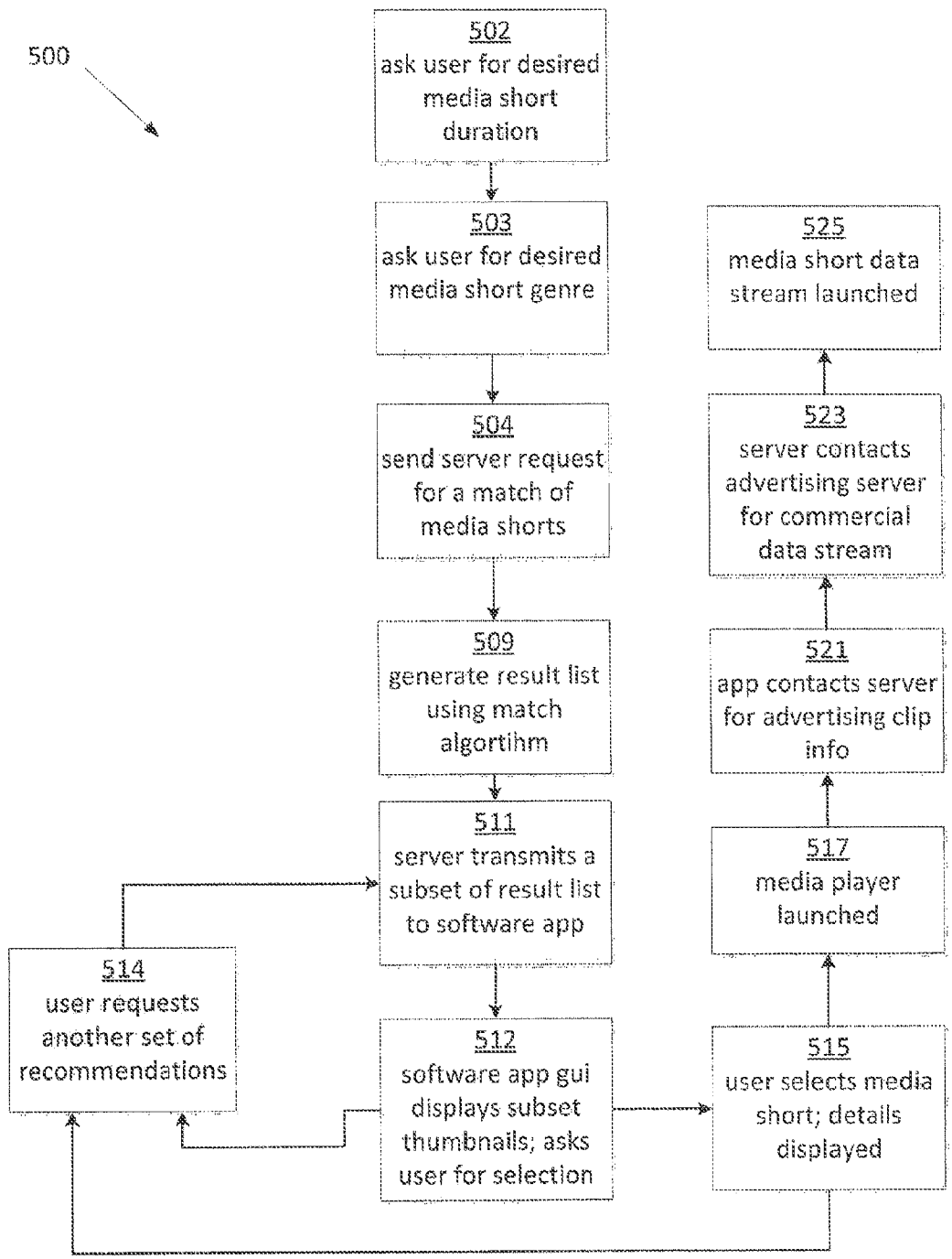
FIG. 5 is a flow chart of the usage phase shown in FIG. 2.

FIG. 5 shows the steps in usage phase 500. Usage phase 500 starts with step 502, in which software application 128 asks user 101 the desired duration for a media short. Optionally, in step 503, software application 503 will additionally ask user 101 what type of genre media short the user desires.

Next, in step 504 software application 128 will send server 134 a request including the desired media short duration and genre type. Step 509 involves algorithm 163 executing a search based upon the user's segmentation numbers located in database 141 and the desired media short duration and genre type. Result list 143 is generated as a result of this search. In step 511, server 134 sends back a subset number of recommendations of result list 143 to application 128. The number of recommendations in this subset may be based upon the type of device user 101's media device 126 is. For example, a smartphone may receive four recommendations, whereas a tablet device may receive eight recommendations. One or more of these results may be a paid recommendation.

Included in the results sent back to application 128 is the media short title 137a, description 137b, thumbnail 137c, and link 137d.

In step 512, software application 128 displays the subset of received thumbnails through its graphical user interface. In step 513, user 101 performs a selection of either one of the media shorts (step 515), or a request for another subset of media shorts (step 514). If a media short is selected, by the user pressing on a thumbnail, software application 128 displays the title 137a, description 137b, thumbnail 137c, and optionally a popularity metric. The popularity metric may be a counter, icon such as a number of stars rating, or a thumbs up/thumbs down.

In step 515, the user selects to play a desired media clip. Following, step 517 involves launching an external player application, or launching an internal media player. In step 521 software media application 128 contacts server 134 for advertising clip retrieval. In step 523, server 134 contacts advertising server 136 for commercial information and data. The commercial will be matched according to assigned segmentation numbers of user 101, and then played through the player. After the commercial is over, in step 525, software application will receive a stream video from either server 134 or third party media content server 171. Upon completion of playing the media short, post play phase 600 is started.

Figure 6:
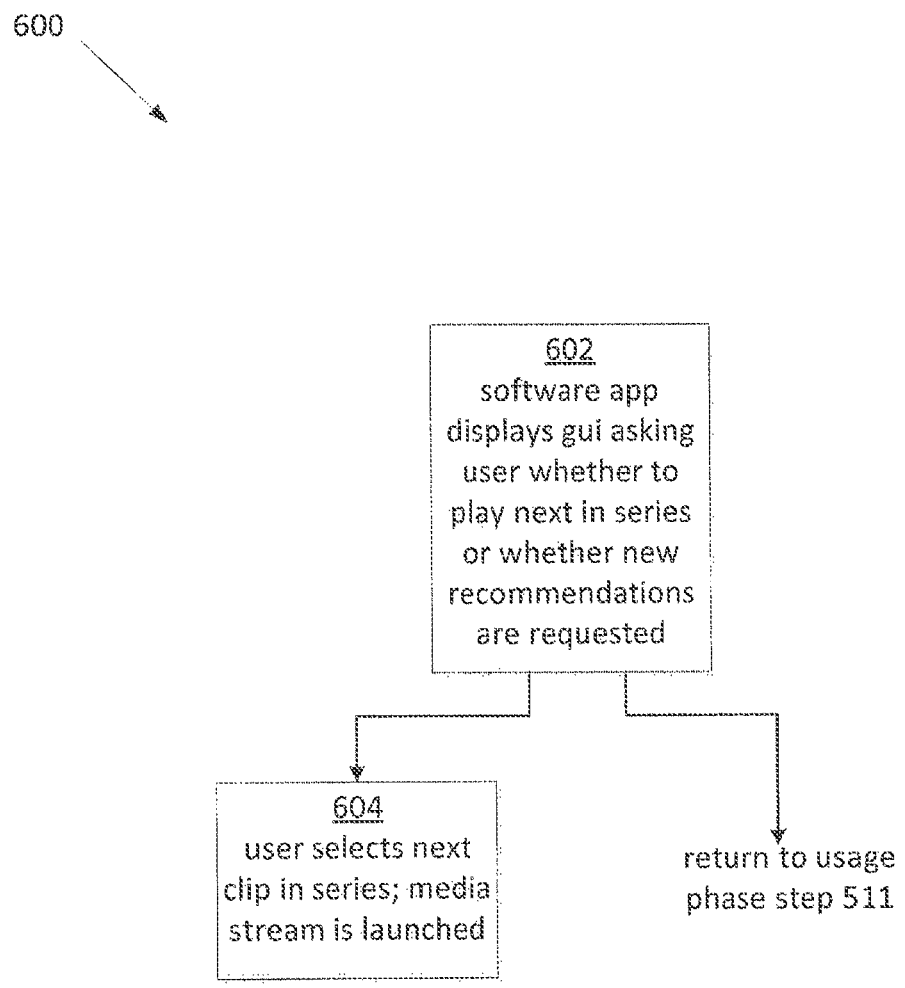
FIG. 6 is a flow chart of the post play phase shown in FIG. 2.

FIG. 6 shows the steps in phase play phase 600. In step 603, software application 128 presents through its graphical user interface a query as to whether user 101 wants to view the next media short in the series, or another four recommendations.

Several alternative embodiments or modifications of the disclosed embodiments are possible. For example, in another embodiment, it may be advantageous to reupload a user's profile data as a function of time. This would accommodate the possibility that a user's profile data may change over time. For example, every twenty days a user's profile data may be reobtained from third party social media server/server 142, and the segmentation numbers associated with user 101 in user database 141 will be updated with a new run of segmentation number match algorithm 161 based upon the new profile.

In another embodiment, software application 128 may obtain location based data, such as GPS or geographic data based upon local wifi networks. This location based data may be provided to advertising server 136 such that the advertising server 136 may provide commercials more appropriately targeted based upon current geographic location. Additionally, media short match algorithm 163 may also use the location based data to create result list 143.

In yet another embodiment, additional data is stored together with a user's entry in user database 141. More specifically a user's media short viewing history and a user assigned rating to various media shorts may be stored in database 141 together with a user's assigned segmentation numbers. For example, if a user watches the second video short in a series, this will cause a positive rating to be applied to the video short series in user database 141. Additionally, if a user cuts a viewing of a video short before the end of the video, this information will also be stored in a similar fashion as a negative rating of the video short in user database 141. In addition, if the video short is shared with others over the third party social media system, this will also be stored in user database 141 as a positive rating. The short match algorithm 163 is enhanced to use this additional data in producing the result list 143. Additionally, software application 128 is modified to ask a user to rate a media short upon the conclusion of playing a given short. Software application 128 will then forward this rating data to server 134 for storage with a user's entry in user database 141. This effectively creates a feedback loop allowing the system to progress over time by continuously improving the ability to provide content most relevant to a user.

The described system and method results in a number of surprising advantages. First, a much higher degree of efficiency is obtained in the delivering branded content to properly target audiences. Because the provided branded content is selected based upon a user's profile, a user's viewing of the provided content is much more likely to result in a favorable experience. Similarly, since the advertisements provided to user 101 are matched based upon the user's profile, a commercial is much more likely to result in a favorable economic benefit for the advertiser. Several advantages also result from the close integration with a third party social media platform. For example, users are able to easily spread favorable branded content with a large number of friends, who upon the user's own experience and knowledge are properly targeted to enjoy the branded content. Further, direct involvement with the third party social media allows the system to easily obtain accurate and current profile data with minimal effort. Obtaining data from a social media profile is much more efficient than asking a user to manually enter profile data, and is much more accurate than guessing a user's profile based upon other metrics.

Additionally, the system and method results in an advantageous technique of generating revenue by receiving payments from advertisers based upon the success and quantity of branded content being spread. This system/method is better than existing advertiser payment schemes, such as pay per click systems, since these systems do not allow leveraging of social media.

Another advantage of the system is that the user experience is tailored to match the needs of a user having a portable media device. Namely, such a user typically only has short periods of time in which to enjoy short media clips. The described system and method allows targeting this specific niche for synergistically providing mobile users with desired short entertainment while allowing advertisers to promote their goods to accurately targeted audiences. The system uniquely allows for the close integration of social media databases and census based demographic population segmentation databases, which results in numerous benefits to the advertiser as well as the user.

Therefore, while the presently preferred forms of practice in the invention have been shown and described, and various modifications thereof discussed, persons skilled in this art will readily appreciate various additional changes and modifications may be made without departing from the spirit of the invention, as defined and differentiated by the following claim.

What is claimed is:

1. A method, comprising:
   from each individual of a plurality of individuals, requesting, in real time, by a specially programmed computer system, utilizing a first specially programmed graphical user interface being displayed on a mobile device of such individual, a consent to obtain an individual social media profile data of such individual from at least one third party social media electronic data source;
   based on the consent, electronically obtaining, in real time, by the specially programmed computer system, the individual social media profile data for each individual of the plurality of individuals from the at least one third party social media electronic data source;
   for each individual from the plurality of individuals, determining, in real time, by the specially programmed computer system, a plurality of individual specific parameters associated with such individual based, at least in part, on the individual social media profile data;
   wherein the plurality of individual specific parameters associated with each individual comprises:
      i) at least one individual-specific zip code, identifying at least one home where such individual resides or which can be used to contact or locate such individual,
      ii) an age group of such individual, and
      iii) a gender of such individual;
   for each individual from the plurality of individuals, electronically submitting, in real time, by the specially programmed computer system, at least one electronic query comprising the at least one particular individual-specific zip code associated with the such individual to at least one third party population electronic data source, having population data regarding a population of individuals;
      wherein the population of individuals being segmented in the at least one third party population electronic data source based on a predetermined segmentation and each segment of the population of individuals being identified in the at least one third party population electronic data source by a segment identifier of a plurality of segment identifiers;
      wherein the predetermined segmentation being based at least in part on individual-specific zip codes identifying a plurality of homes where each respective individual of the plurality of individuals resides or which can be used to contact or locate each respective individual of the plurality of individuals;
   for each individual from the plurality of individuals, in response to the at least one electronic query, electronically receiving, in real time, by the specially programmed computer system, from the at least one third party population electronic data source, at least one first segment identifier associated with the at least one particular individual-specific zip code;
   for each individual from the plurality of individuals, associating, in real time, by the specially programmed computer system, the at least one first segment identifier with the individual social media profile data of such individual based, at least in part, on the age group of such individual and the gender of such individual;
   for each individual from the plurality of individuals, determining, in real time, by the specially programmed computer system, at least one first individual advertisement personalized for such individual, based, at least in part, on the at least one first segment identifier associated with the individual social media profile data of such individual; and
   for each individual from the plurality of individuals, delivering, in real time, by the specially programmed computer system, utilizing a second specially programmed graphical application interface being displayed on the mobile device of such individual, the at least one first individual advertisement personalized for such individual to such individual.

2. The method of claim 1, wherein the electronically obtaining of the individual social media profile data for each individual of the plurality of individuals comprises:
   for each individual from the plurality of individuals, electronically and periodically obtaining, by the specially programmed computer system, the individual social media profile data;
   for each individual from the plurality of individuals, determining, in real time, by the specially programmed computer system, at least one change in the individual social media profile data over a period of time;

for each individual from the plurality of individuals, changing, in real time, by the specially programmed computer system, at least one individual specific parameter associated with such individual based, at least in part, on the at least one change in the individual social media profile data over the period of time;

based on the changing, associating, in real time, by the specially programmed computer system, at least one second segment identifier with the individual social media profile data of such individual based, at least in part, on the at least one individual specific parameter associated with such individual;

for each individual from the plurality of individuals, delivering, in real time, by the specially programmed computer system, at least one second individual advertisement personalized for such individual to such individual.

3. The method of claim 1, wherein the delivering of the at least one first individual advertisement to such individual is further based on at least one present geographic location of such individual.

4. The method of claim 1, wherein the associating is further based on a similarity ranking.

5. A system, comprising:
at least one specialized computer machine, comprising:
a non-transient memory having at least one region for storing particular computer executable program code; and
at least one processor for executing the particular program code stored in the memory, wherein the particular program code comprises:
from each individual of a plurality of individuals, code to request, in real time, utilizing a first specially programmed graphical user interface being displayed on a mobile device of such individual, a consent to obtain an individual social media profile data of such individual from at least one third party social media electronic data source;
based on the consent, code to electronically obtain, in real time, the individual social media profile data for each individual of the plurality of individuals from the at least one third party social media electronic data source;
for each individual from the plurality of individuals, code to determine, in real time, a plurality of individual specific parameters associated with such individual based, at least in part, on the individual social media profile data;
wherein the plurality of individual specific parameters associated with each individual comprises:
i) at least one particular individual-specific zip code, identifying at least one home where such individual resides or which can be used to contact or locate such individual,
ii) an age group of such individual, and
iii) a gender of such individual;
for each individual from the plurality of individuals, code to electronically submit, in real time, at least one electronic query comprising the at least one particular individual-specific zip code associated with the such individual to at least one third party population electronic data source, having population data regarding a population of individuals;
wherein the population of individuals being segmented in the at least one third party population electronic data source based on a predetermined segmentation and each segment of the population of individuals being identified in the at least one third party population electronic data source by a segment identifier of a plurality of segment identifiers;
wherein the predetermined segmentation being based at least in part on individual-specific zip codes identifying a plurality of homes where each respective individual of the plurality of individuals resides or which can be used to contact or locate each respective individual of the plurality of individuals;
for each individual from the plurality of individuals, in response to the at least one electronic query, code to electronically receive, in real time, from the at least one third party population electronic data source, at least one first segment identifier associated with the at least one particular individual-specific zip code;
for each individual from the plurality of individuals, code to associate, in real time, the at least one first segment identifier with the individual social media profile data of such individual based, at least in part, on the age group of such individual and the gender of such individual;
for each individual from the plurality of individuals, determining, in real time, by the specially programmed computer system, at least one first individual advertisement personalized for such individual, based, at least in part, on the at least one first segment identifier associated with the individual social media profile data of such individual; and
for each individual from the plurality of individuals, code to deliver, in real time, by the specially programmed computer system, utilizing a second specially programmed graphical application interface being displayed on the mobile device of such individual, the at least one first individual advertisement personalized for such individual to such individual.

6. The system of claim 5, wherein the code to electronically obtain the individual social media profile data for each individual of the plurality of individuals comprises:
for each individual from the plurality of individuals, code to electronically and periodically obtain the individual social media profile data;
for each individual from the plurality of individuals, code to determine, in real time, at least one change in the individual social media profile data over a period of time;
for each individual from the plurality of individuals, code to change, in real time, at least one individual specific parameter associated with such individual based, at least in part, on the at least one change in the individual social media profile data over the period of time;
based on the changing, code to associate, in real time, at least one second segment identifier with the individual social media profile data of such individual based, at least in part, on the at least one individual specific parameter associated with such individual;
for each individual from the plurality of individuals, code to deliver, in real time, at least one second individual advertisement personalized for such individual to such individual.

7. The system of claim 5, wherein the code to deliver the at least one first individual advertisement to such individual considers at least one present geographic location of such individual.

8. The system of claim 5, wherein the code to associate further considers a similarity ranking.

* * * * *